United States Patent

[11] 3,572,742

[72] Inventor Theodore L. Marker
 5713 Oliva Ave., Lakewood, Calif. 90712
[21] Appl. No. 833,251
[22] Filed June 16, 1969
[45] Patented Mar. 30, 1971

[54] COLLAPSIBLE DOOR-SUPPORTING DOLLY
 7 Claims, 4 Drawing Figs.
[52] U.S. Cl. ................................................. 280/42,
 214/1, 280/79.3
[51] Int. Cl. ..................................................... B62b 5/00
[50] Field of Search ........................................ 280/79.3,
 42, 36; 296/3; 214/1, 1 (S), 1 (SWB), 1 (R)

[56] References Cited
UNITED STATES PATENTS
1,697,364 1/1929 McCollum et al. ........... 280/79.3
2,028,133 1/1936 Bowers ........................ 280/79.3
3,178,038 4/1965 Love ............................ 214/1(SWB)

*Primary Examiner*—Leo Friaglia
*Assistant Examiner*—Robert R. Song
*Attorney*—William C. Babcock ABSTRACT: A collapsible door-supporting dolly that is adapted to hold a heavy door or the like object in a vertical position whereby the door may be moved to a desired destination, yet the dolly maintains the door in a horizontal position while work is performed thereon. When the dolly is not in use it may be collapsed to occupy a minimum of space, a highly desirable feature when the dolly is being transported from one job site to another, or when stored.

PATENTED MAR 30 1971 3,572,742

INVENTOR.
THEODORE L. MARKER
BY
William G. Babcock
ATTORNEY

COLLAPSIBLE DOOR-SUPPORTING DOLLY

BACKGROUND OF THE INVENTION

1. Field of the Invention

A collapsible dolly for use in moving heavy doors or the like in a vertical position from place to place, which dolly is also capable of holding the door in a horizontal position whereby work may be performed thereon.

2. Description of the Prior Art

In the past, various types of carts and hand trucks have been used in moving heavy doors from place to place on a job site, but have been found to be heavy and bulky structurally, and frequently require several men to move a heavy door to a desired destination. Also, when such prior-art carts or trucks are used for transporting a door, the door has to be lifted therefrom and supported by other means in a horizontal position if work is to be performed thereon.

The present invention overcomes these operational disadvantages found in prior equipment of the type described in that it provides a lightweight collapsible dolly that not only permits one man to move a heavy door from place to place, but the door may also be swung into a horizontal position and supported by the dolly while work is being performed thereon.

SUMMARY OF THE INVENTION

A collapsible dolly that is particularly adapted to support a heavy door in a vertical position, to permit the door to be moved by one man to a desired destination, and thereafter while remaining on the dolly may be disposed in a horizontal position. The dolly of the present invention is of relatively lightweight structure, and when not in use, or being transported from one job site to another, may be collapsed into a compact configuration to occupy a minimum of space.

A major object of the present invention is to provide a lightweight door-supporting dolly that may be collapsed into a compact configuration to occupy a minimum of storage space when not in use or when being transported from job site to job site, and one which may be used by a single individual to move a heavy door to a desired destination. After said destination is reached the door is so horizontally supported on the dolly that work to be performed thereon without recourse to other supporting equipment.

Another object of the invention is to provide a door-supporting dolly of simple mechanical structure which requires a minimum of maintenance attention, can be fabricated from standard, commercially available materials, requires no elaborate plant facilities for its production, and may accordingly be retailed at a sufficiently low price as to encourage the widespread use thereof in the construction industry.

DESCRIPTION OF THE PREFERRED EMBODIMENT

Figure 1:
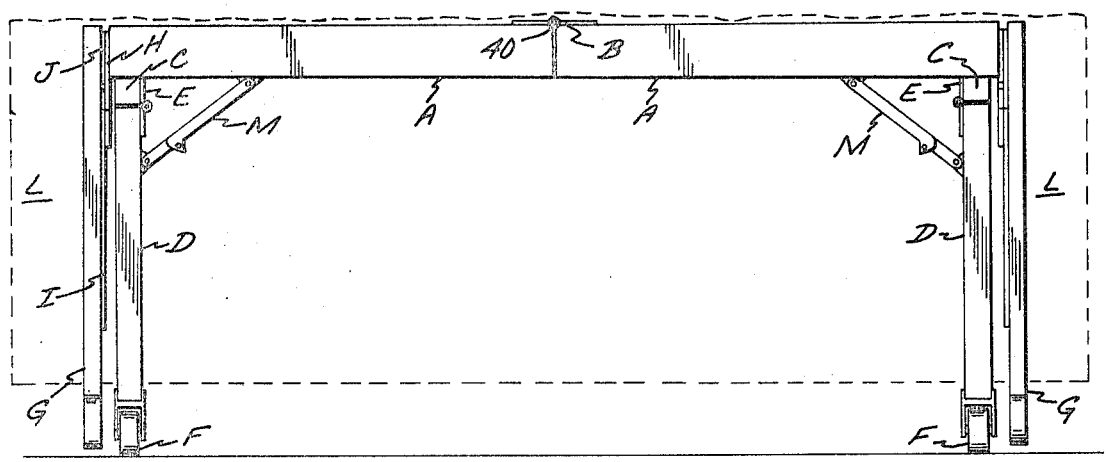
FIG. 1 is a front elevational view of the collapsible dolly.
Figure 2:
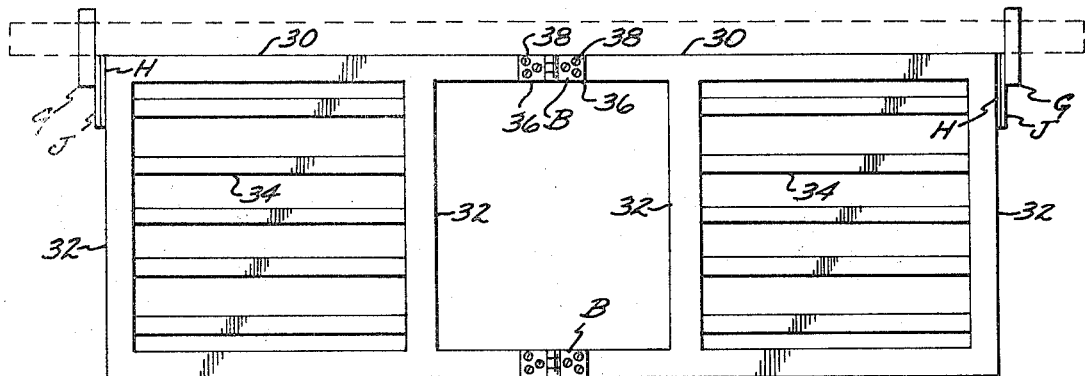
FIG. 2 is a top plan view of the dolly, with the door supported thereon being indicated in phantom line.

The collapsible dolly Y as may best be seen in FIGS. 1 and 2, includes two axially aligned, generally rectangular frames A, the first ends 10 of which are adjacently disposed. Two first hinges B pivotally connect the first ends 10 of the frames A and permit the frames to be pivoted from horizontal positions (FIG. 1) to vertically disposed positions illustrated in FIG. 4 when the dolly is in a collapsed position. Two transverse elongate blocks C are secured to the under side of second ends 12 of the frames A as illustrated in FIG. 1. Two side pieces D are provided, preferably in the form of open frames, which side pieces when in first positions, lie in the same vertical plane as that of the blocks C as may be seen in FIG. 1.

Second hinge means E are also provided that pivotally connect first ends 14 of the side pieces D in the manner shown in FIG. 1 to block C. The side pieces D each have rollers or casters F mounted on the lower ends thereof, which rollers rest on a floor surface 16, to permit the collapsible dolly to be wheeled to a desired destination thereon. Two elongate, generally J-shaped door supports G are disposed on the forward portion of the dolly Y, with the door support having hooks 18 formed in the lower portion thereof, which removably engage the lower edge of a door L to be supported in a vertical position for transportation to a desired destination, or in a horizontal position, as shown in FIG. 3, where work may be performed thereon.

Two elongate rigid plates H are secured to the upper exterior side surfaces of the side pieces D (FIG. 3), with the plates preferably extending upwardly and forwardly relative thereto.

The first end portions of two elongate first rigid links I are pivotally supported on studs 20 that project outwardly from the lower portions of plates H. Second end portions of the links I are pivotally connected to studs 22 which project outwardly from the door supports G, as may best be seen in FIG. 3.

Figures 3, 4:
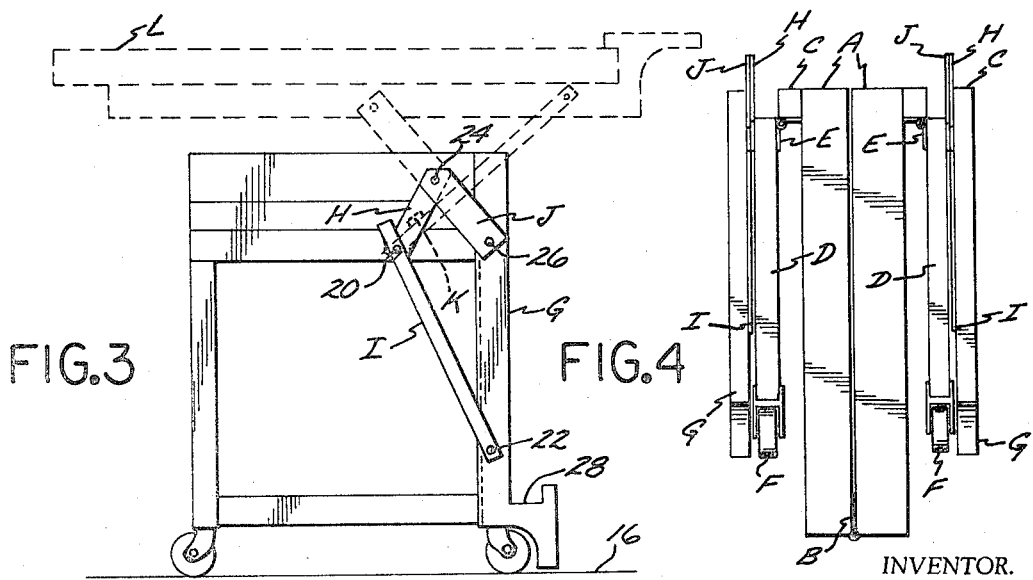
FIG. 3 is a side elevational view of the device, with the door-supporting portion thereof being indicated in phantom line when it occupies a position where the engaged door is horizontally disposed.
FIG. 4 is a front elevational view of the dolly after the same has been collapsed for storage purposes, or to permit transportation thereof to a different job site.

Two second rigid links J are pivotally connected to studs 24 and 26 mounted on the exterior surfaces of the plates H and door supports G (FIG. 3). The positions the first and second links I and J, respectively, occupy when the door support G is horizontally positioned are indicated in phantom line in FIG. 3. Stops K project outwardly from plates H, and these stops are contacted by the links I when the door support G is horizontally positioned. The stops K prevent pivotal movement of the door supports G from beyond the horizontal.

Each of the door supports G has a hook 28 formed in the lower portion thereof that removably engages the lower part of door L. The hooks 28 not only serve to support the door L vertically on the door supports G but in a horizontal position, as well as illustrated in phantom line in FIG. 3. The side pieces D are selectively held at right angles to the frame A (FIG. 1) by conventional locking means M.

For ease in moving the dolly Y from one job site to another, the two frames are preferably of the structure shown in FIG. 1. Each frame A is defined by two laterally spaced, parallel side pieces 30 and transverse crosspieces 32. A number of spaced reinforcing members 34 extend between the crosspieces 32.

The first hinge means B comprise butt hinges, the plates 36 of which are secured to the upper surfaces of side pieces 30 by screws 38 or the like. Eyes (not shown) are formed in plates 36 through which pins 40 extend. The hinge means B are so positioned on side pieces 30 that the frames A may pivot only between the horizontal positions shown in FIG. 2 and the vertical positions illustrated in FIG. 4. Second hinge E are of the same structure as first hinges B, and accordingly need not be described in detail.

In use, the operation of the dolly Y is most simple. The dolly Y will normally be stored or carried from job site to job site when in the collapsed, compact configuration shown in FIG. 4. When the dolly Y is to be used, it is expanded to the position shown in FIG. 1. During transportation thereof the lower portion of door L is disposed within the confines of the hook 28. The dolly Y may then be used to transport the door L in a vertical position to a desired location. When the destination is reached and it is desired to perform work on the door L, the door supports G are pivoted into the horizontal positions illustrated in FIG. 3. When the supports G are horizontally disposed, the door L is held in a horizontal position due to engagement thereof with the hooks 28. After completion of work thereon, and it is desired to hang the door L, the door supports G are pivoted to the positions shown in FIG. 3 whereby the door is placed in a vertical position. When it is desired to store the dolly Y or transfer it to another job site, the dolly is collapsed into the configuration shown in FIG. 4. It will be particularly noted in FIG. 1 that the first hinge means B so connects the two frames A, that the frames cannot pivot upwardly beyond a horizontal position. The hinges E also pivotally connect the side pieces D to the blocks C in such a manner that the side pieces cannot pivot outwardly relative to the frames A beyond positions where they assume a position normal relative to the frames.

I claim:

1. A collapsible dolly for handling heavy doors, and the like, including:
    a. two axially aligned, adjacently disposed, generally rectangular flat top members hingedly connected on the adjacent ends thereof to permit said top members to occupy either a first position wherein said top members lie in a common horizontal plane or a second position wherein said top members are substantially vertically disposed in side-by-side relationship;
    b. two elongate blocks secured in transverse positions to the free ends of said top members, which blocks, are disposed under said top members when said top members are in said first position;
    c. two substantially rectangular side members hingedly connected at one end to said blocks in such a manner that said side members may occupy either first positions in a direction normal to said top members or second positions where they are substantially parallel to said top members and disposed adjacent thereto;
    d. first manually operable means for maintaining said side members in said first positions when said top members are in their first positions;
    e. two laterally spaced door-supporting members capable of removably engaging a lower edge portion of a door, which door-supporting members are disposed adjacent to forward portions of said side members;
    f. second means for pivotally supporting said door-supporting members from said side members, which door-supporting members are capable of occupying either a vertical position or a horizontal position adjacent to said side members above said flat top members in said first position;
    g. a means mounted on the free ends opposite to said one end of said side members to permit said dolly, when said top and side members are in said first positions, to be moved over a supporting floor surface, and with said door-supporting members when said dolly is so moved, being capable of supporting a door in either said vertical or horizontal position; and
    h. stop means for limiting the pivotal movement of said door-supporting members rearwardly beyond to said horizontal position, with said door supports when in said horizontal position so supporting a door in a horizontal position that work may be performed thereon, which dolly when not in use or during transportation thereof is collapsed and occupies a minimum of space when said top members and side members are disposed in said second positions.

2. A dolly as defined in claim 1 wherein each of said top members comprise open frames that include laterally spaced side pieces hingedly connected on the adjacent ends thereof in such a manner that said top members cannot pivot above said first position and can only pivot downwardly and inwardly towards one another to said second position.

3. A dolly as defined in claim 1 wherein each of said side members comprise open rectangular rigid frames which are so hingedly connected to said blocks that said side members cannot pivot outwardly beyond said first positions wherein said side members are normal relative to said top members.

4. A dolly as defined in claim 1 wherein said dolly further includes:
    i. two rigid elongate plates extending upwardly above the upper portions of said side members when said side members and top members are in said first positions, and on which plates said second means is pivotally supported.

5. A dolly as defined in claim 4 wherein said second means includes:
    j. two downwardly and forwardly extending elongate first links pivotally connected to said plates and to said door support members; and
    h. two downwardly and forwardly extending elongate second links pivotally connected to said plates and to said door support members, with said second links being disposed above said first links.

6. A dolly as defined in claim 5 wherein said stop means comprises two lugs that project outwardly from said plates and are engaged by said first links when said door supporting members have been pivoted to said horizontal position.

7. A dolly as defined in claim 1 wherein said door-supporting members comprising rigid elongate legs with hooks formed in the lower portion thereof, said hooks being adapted to removably engage said lower edge portion of a door.